(12) United States Patent
Jung

(10) Patent No.: US 10,230,615 B2
(45) Date of Patent: Mar. 12, 2019

(54) SYSTEM AND METHOD FOR OPTIMIZING NETWORK PERFORMANCE BASED ON PROFILING

(71) Applicant: Korea Electronics Technology Institute, Seongnam-si, Gyeonggi-do (KR)

(72) Inventor: Hye Dong Jung, Seoul (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 138 days.

(21) Appl. No.: 15/331,621

(22) Filed: Oct. 21, 2016

(65) Prior Publication Data

US 2017/0118107 A1    Apr. 27, 2017

(30) Foreign Application Priority Data

Oct. 23, 2015    (KR) ........................ 10-2015-0148330

(51) Int. Cl.
*H04L 12/26* (2006.01)
*H04L 29/08* (2006.01)

(52) U.S. Cl.
CPC ............. *H04L 43/50* (2013.01); *H04L 43/16* (2013.01); *H04L 67/10* (2013.01)

(58) Field of Classification Search
USPC ....................................................... 709/201
See application file for complete search history.

(56) References Cited

U.S. PATENT DOCUMENTS

| 7,827,257 | B2 * | 11/2010 | Chu | H04L 43/0852 709/201 |
| 8,856,376 | B1 * | 10/2014 | Watson | G06F 11/3419 370/230 |
| 2007/0234158 | A1 * | 10/2007 | Shin | G11C 29/1201 714/731 |

(Continued)

OTHER PUBLICATIONS

Menshov et al., "Highly scalable implementation of an implicit matrix-free solver for gas dynamics on GPU-accelerated clusters," *J Supercomput*, DOI 10.1007/s112227-016-1800-1, pub. online Jun. 28, 2016, Springer Science+Business Media New York, in 8 pages.

*Primary Examiner* — Umar Cheema
*Assistant Examiner* — John Fan
(74) *Attorney, Agent, or Firm* — Knobbe Martens Olson & Bear LLP

(57) ABSTRACT

A method for optimizing network performance according to an embodiment of the present invention includes initializing a size of test data for network performance measurement, performing a test on the network performance by transmitting the test data to each of a first communication protocol and a second communication protocol, repeatedly performing the test, when the size of the test data is increased and then the increased size of the test data is a preset size or smaller based on a comparison between the increased size of the test data and the preset size, and setting a threshold value having a data size being a reference of switching between the first communication protocol and the second communication protocol, based on data collected through the performing of the test, when the increased size of the test data is larger than the preset size.

6 Claims, 4 Drawing Sheets

(56) References Cited

U.S. PATENT DOCUMENTS

| | | | |
|---|---|---|---|
| 2009/0170557 A1* | 7/2009 | Chauhan | H04W 36/14 455/552.1 |
| 2012/0072607 A1* | 3/2012 | Kawashima | H04L 67/32 709/230 |
| 2016/0285672 A1* | 9/2016 | Huang | G06F 17/30029 |

* cited by examiner

SYSTEM AND METHOD FOR OPTIMIZING NETWORK PERFORMANCE BASED ON PROFILING

INCORPORATION BY REFERENCE TO ANY PRIORITY APPLICATIONS

This application claims priority to and the benefit of Korean Patent Application No. 10-2015-0148330, filed on Oct. 23, 2015, the disclosure of which is incorporated herein by reference in its entirety.

BACKGROUND

Field

The described technology relates to a technology for optimizing network performance, and more particularly, to a system and method for optimizing network performance using data transmission/reception software in a computing environment using distributed processing.

Description of the Related Art

In a high-performance computing environment which is typically based on distributed computing, data transmission and reception between distributed computing nodes is necessary, and thus efficiency of such data transmission and reception is also an important factor in the distributed computing.

As a representative method in which each computing node transmits and receives data in the distributed computing environment, there is MPI (message passing interference), and there exist a variety of software libraries in the form of an open source for implementing MPI.

As a representative MPI library, there are MVAPICH, MPICH, and the like, and most MPI libraries use an eager protocol and a rendezvous protocol in parallel as a data transmission/reception protocol.

The eager protocol is suitable for rapidly transmitting a relatively small size of data because it does not need a handshake process at the time of data transmission/reception, and unlike the eager protocol, the rendezvous protocol is suitable for accurately transmitting a relatively large size of data because it should be subjected to the handshake process.

Existing MPI libraries have used a fixed data size to switch between such eager protocol and rendezvous protocol. That is, the eager protocol has been used in the exchange of data having a size smaller than the fixed data size, and the rendezvous protocol has been used in the exchange of data having a size larger than the fixed data size.

FIG. 1 is a flowchart illustrating a method for setting a protocol in order to use eager/rendezvous protocols in a complementary manner in such a general MPI library.

Whenever there is a data transmission request, a size of data to be transmitted may be compared with a preset fixed threshold value, so that the eager protocol may be used when the size of data to be transmitted is smaller than the threshold value, and the rendezvous protocol may be used when the size of data to be transmitted is larger than the threshold value. As the threshold value used in the comparison, a fixed value that does not consider characteristics of a network and a topology may be used.

However, in the high-performance computing environment, an optimal operation switching criteria should be changed depending on a network technology for connecting distributed nodes and a constituted network topology.

Nevertheless, the existing MPI libraries have a fixed protocol switching criteria which does not consider network characteristics and the fixed protocol switching criteria also depends on manual setting, and therefore the optimal operation switching criteria which depend on a change in the network performance cannot be set.

SUMMARY

One inventive aspect is a system and method for optimizing performance of a network by automatically setting and changing switching criteria between protocols based on actual performance of a network topology in a distributed computing environment.

The technical objectives of the inventive concept are not limited to the above disclosure; other objectives may become apparent to those of ordinary skill in the art based on the following descriptions.

According to an aspect of the present invention, there is provided a method for optimizing network performance, which is performed by each computing node in a distributed computing environment, the method including: initializing a size of test data for network performance measurement; performing a test on the network performance by transmitting the test data to each of a first communication protocol and a second communication protocol; repeatedly performing the test, when the size of the test data is increased and then the increased size of the test data is a preset size or smaller based on a comparison between the increased size of the test data and the preset size; and setting a threshold value having a data size being a reference of switching between the first communication protocol and the second communication protocol, based on data collected through the performing of the test, when the increased size of the test data is larger than the preset size.

According to another aspect of the present invention, there is provided a computing device in a distributed computing environment constituted of a plurality of computing devices, the computing device including: a threshold value setting unit that sets a threshold value having a data size for inter-switching between a first communication protocol and a second communication protocol; a control unit that compares the threshold value set by the threshold value setting unit with a size of data to be transmitted, and determines to transmit data to any one of the first communication protocol and the second communication protocol; and a communication unit that transmits data according to the protocol determined by the control unit.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Advantages and characteristics of the present invention, and methods for achieving them will be apparent with reference to embodiments described below in detail in addition to the accompanying drawings. However, the present invention is not limited to the exemplary embodiments to be described below but may be implemented in various forms. Therefore, the exemplary embodiments are provided to enable those skilled in the art to thoroughly understand the teaching of the present invention and to completely inform the scope of the present invention and the exemplary embodiment is just defined by the scope of the appended claims. Meanwhile, terms used in the specification are used to explain the embodiments and not to limit the present invention. In the specification, a singular type may also be used as a plural type unless stated specifically. "Comprises" and/or "comprising" used in the specification mentioned components, steps, operations and/or elements do not exclude the existence or addition of one or more other components, steps, operations and/or elements.

Hereinafter, embodiments will be described in detail with reference to the accompanying drawings.

In the prior art, a fixed threshold value has been used for switching between an eager protocol and a rendezvous protocol.

Figure 1:
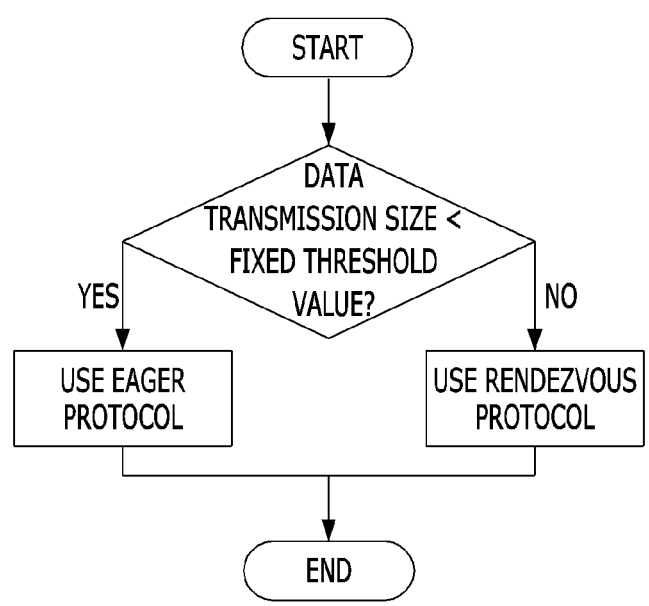
FIG. 1 is a flowchart illustrating a method for determining a network protocol using a conventional fixed threshold value.
Figure 2:
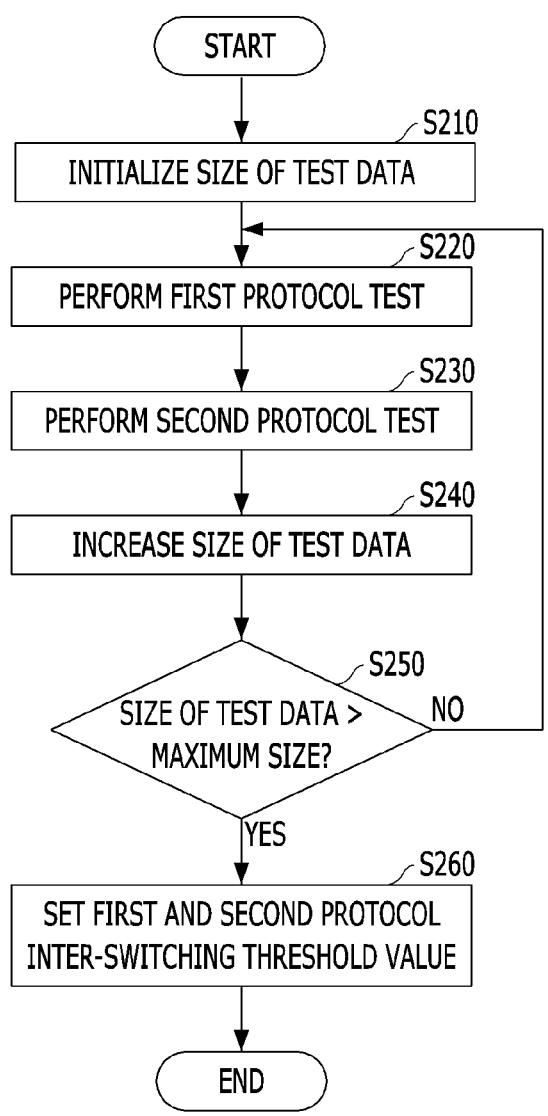
FIG. 2 is a flowchart illustrating a method for setting a threshold value for protocol selection according to an embodiment of the present invention.

In comparison, in the present invention, a threshold value which is optimized depending on a network communication scheme for connecting distributed computing nodes and actual performance of a topology may be used. FIG. 2 is a flowchart illustrating a method for setting a threshold value according to an embodiment of the present invention which is used to obtain such an optimized threshold value.

Here, in order to determine a threshold value for selecting an eager protocol and a rendezvous protocol, the method performs a repeated operation using test and profiling.

In operation S210, the method first initializes a size of data for testing in order to identify a network environment.

Next, in operation S220, the method first transmits test data using the eager protocol, measures transmission performance using the transmission result, and stores the measured transmission performance in profile information.

Next, in operation S230, the method transmits test data using the rendezvous protocol, measures transmission performance, and stores the measured transmission performance in profile information.

In the present embodiment, the test has been performed using two protocols of the eager protocol and the rendezvous protocol, but a different protocol other than the two protocols may be used, and obviously, the number of protocols to be tested may be three or more.

In operation S240, the method increases the size of the test data when a data transmission test performed by each of the eager protocol and the rendezvous protocol is completed.

The increase in the size of the test data may be set to be twice a previous size of the test data for a quick test. In addition, for an accurate test rather than the quick test, a method for performing a test while increasing the size of the test data in sequence by a preset fixed size is also available.

In operation S250, after increasing the size of the test data, the method determines whether to continue to perform the test by comparing the increased size of the test data with a preset maximum size of the test data.

When the increased size of the test data does not reach the maximum size, the method repeatedly performs the test using the eager protocol and the rendezvous protocol again.

On the other hand, when the size of the test data becomes larger than the maximum size, the method stops the test, sets a threshold value of the data size capable of determining inter-switching between the eager protocol and the rendezvous protocol by analyzing profiling information stored while repeatedly performing the test, and terminates the test in operation S260.

A method for obtaining an optimal threshold value for protocol switching may be performed when a distributed computing operation utilizing MPI is initially started.

When the corresponding operation takes a relatively long time, method for obtaining an optimal threshold value for protocol switching may be performed by utilizing an idle time that intermittently exists in the corresponding operation.

In addition, the method for obtaining an optimal threshold value for protocol switching may be also performed whenever the network environment is monitored and a change in the network environment is detected.

Through these methods, the optimal threshold value may be actively determined depending on the network environment, and used.

Figure 3:
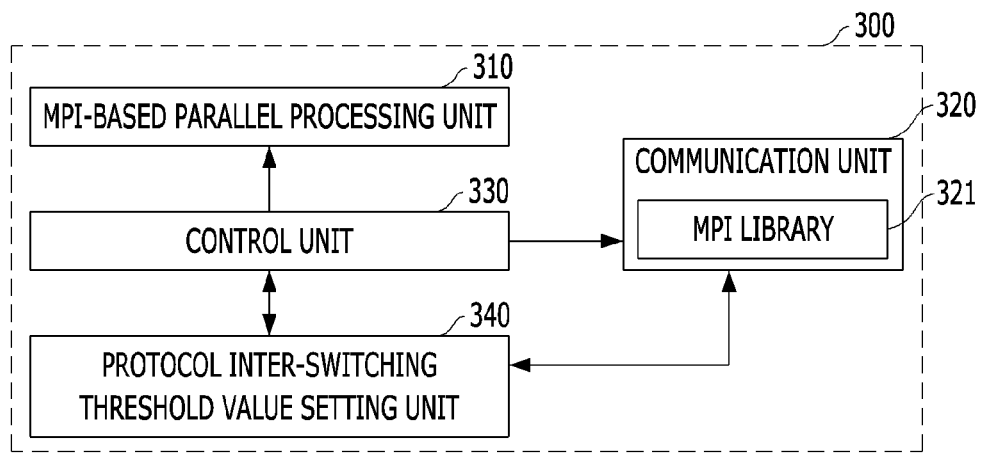
FIG. 3 is a block diagram illustrating a computing device including a threshold value setting unit for network optimization according to another embodiment of the present invention.

FIG. 3 shows a computing device 300 capable of setting an optimal protocol inter-switching threshold value according to an embodiment of the present invention.

The computing device 300 used as each node of distributed computing includes an MPI-based parallel processing unit 310, a communication unit 320 including an MPI library 321, a control unit 330, and a protocol inter-switching threshold value setting unit 340.

The MPI-based parallel processing unit 310 receives data from the control unit 330 or the communication unit 320, and processes computations required for the distributed computing.

The communication unit 320 may include the MPI library 321, and transmit and receive data by varying a communication protocol according to the control of the control unit 330 when transmitting and receiving data to and from other distributed computing nodes.

The control unit 330 determines a protocol to be used by comparing a threshold value set by the threshold value setting unit 340 with a size of data to be transmitted, and transmits data through the communication unit 320 according to the determined protocol.

In some cases, the control unit 330 may include the MPI-based parallel processing unit 310, and vice versa.

The protocol inter-switching threshold value setting unit 340 may set the threshold value by transmitting and receiving test data to and from the other computing nodes through the communication unit 320 according to the above-described threshold value setting method, and transmit the set threshold value to the control unit 330, thereby determining a protocol required for communication.

Figure 4:
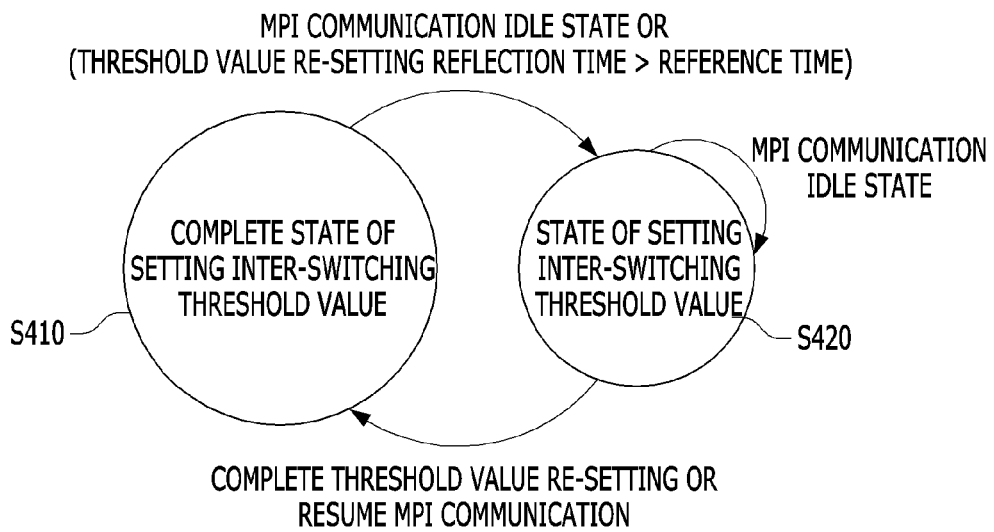
FIG. 4 is a diagram illustrating switching of a state of a threshold value setting unit of a computing device according to another embodiment of the present invention.

FIG. 4 shows state transition diagram of the threshold value setting unit 340 for the use of an active inter-switching threshold value.

According to the method for setting the threshold value of FIG. 2, in a state (S410) in which the setting of the threshold value is completed after the end of the test, the control unit 330 determines a transmission protocol by comparing the threshold value with a size of data to be transmitted, and the threshold value setting unit 340 maintains the completion state (S410).

In this state, when MPI communication is in an idle state or a duration in which the threshold value setting unit 340 maintains the completion state (S410) exceeds a reference time for periodically re-setting the threshold value, the threshold value setting unit 340 switches the current state to a state (S420) of setting the threshold value in order to set the threshold value for protocol inter-switching.

The switching to the state (S420) of setting the threshold value may be performed, if necessary, such as a case in which it is detected that the corresponding network condition is changed even if the MPI communication is not in the idle state or the duration in which the threshold value setting unit 340 maintains the completion state (S410) does not exceed the reference time for periodically re-setting the threshold value, or the like.

In the state (S420) of setting the threshold value, the threshold value setting unit 340 sets the threshold value according to the above-described method of FIG. 2.

When the MPI communication continuously maintains the idle state, the threshold value setting unit 340 maintains the state (S420) of setting the threshold value while continuously updating the threshold value, and when the re-setting of the threshold value is completed or communication is resumed after the end of the MPI idle state, the threshold value setting unit 340 switches the current state to the state (S410) in which the setting of the threshold value is completed again.

Figure 5:
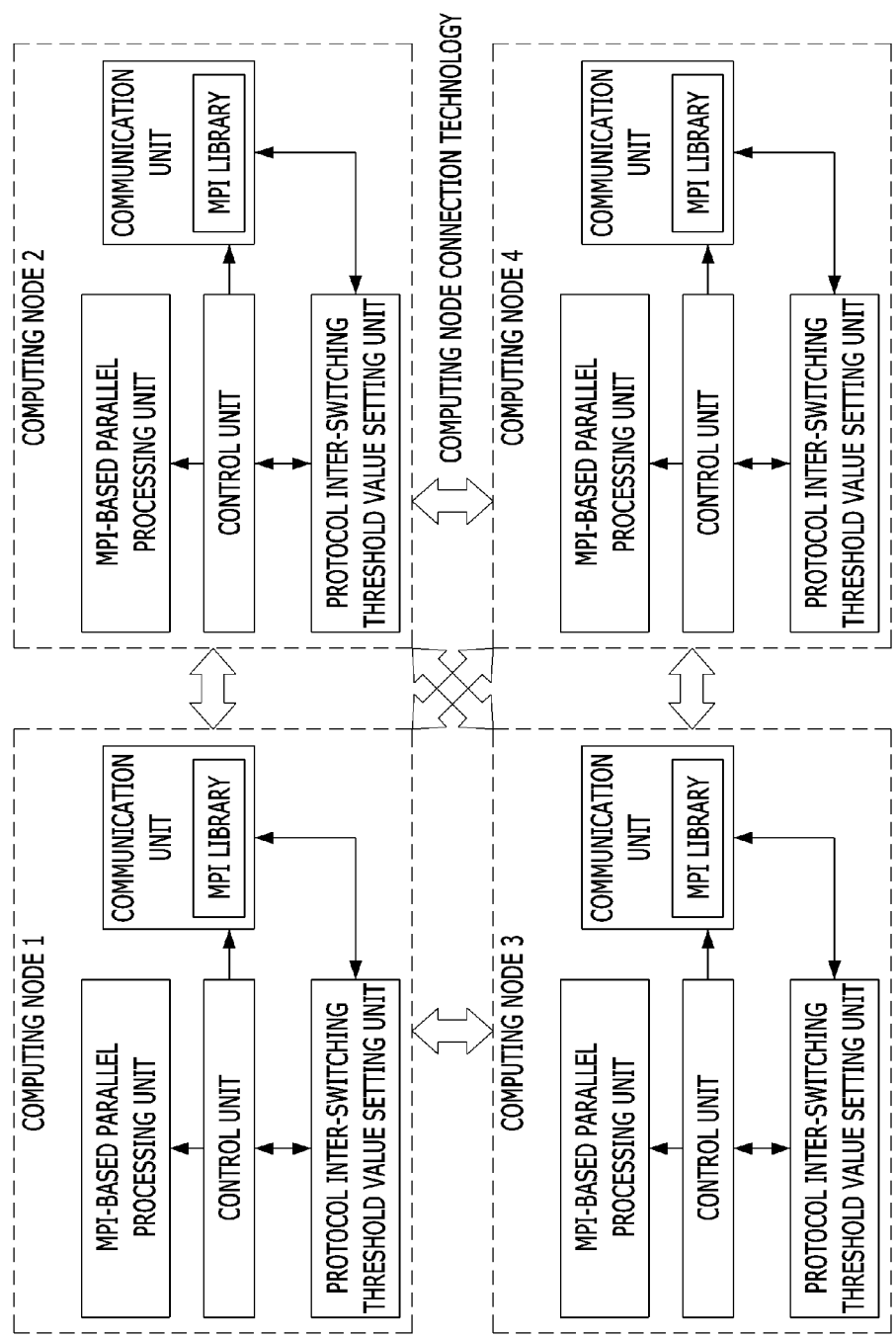
FIG. 5 is a block diagram illustrating a distributed computing environment including a computing device according to another embodiment of the present invention.

FIG. 5 shows a state of communication between computing nodes having such a protocol inter-switching threshold value setting unit. The respective computing nodes may transmit and receive data using a computing node connection technology, and a technology such as infiniband may be used.

In this manner, when the threshold value for optimal eager/rendezvous protocol inter-switching is set by the threshold value setting unit 340, MPI-based parallel processing is performed based on the set threshold value.

Since the communication protocol is determined using the optimal threshold value, it is possible to minimize a data transmission delay time between the computing nodes, thereby improving data transmission/reception performance in the distributed computing environment.

As described above, according to the present invention, an optimal protocol switching threshold value may be automatically set according to actual performance caused by the network characteristics and the network topology rather than using a fixed protocol switching threshold value, thereby improving data transmission efficiency between respective distributed computing nodes constituting a high-performance computing environment.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for optimizing network performance, which is performed by each computing node in a distributed computing environment, the method comprising:
   initializing a size of test data for network performance measurement;
   performing a test on the network performance by transmitting the test data to each of a first communication protocol and a second communication protocol;
   repeatedly performing the test, when the size of the test data is increased and then the increased size of the test data is a preset size or smaller based on a comparison between the increased size of the test data and the preset size;
   setting, by a threshold value setting processor, a threshold value having a data size being a reference of switching between the first communication protocol and the second communication protocol, based on data collected through the performing of the test, when the increased size of the test data is larger than the preset size; and
   switching from a setting state to a completion state, wherein when a duration in which the completion state exceeds a reference time for periodically re-setting the threshold value, the threshold value setting processor switches the completion state to the setting state of setting the threshold value in order to set the threshold value for protocol inter-switching.

2. The method for optimizing network performance of claim 1, wherein the first communication protocol is an eager protocol and the second communication protocol is a rendezvous protocol, or the first communication protocol is a rendezvous protocol and the second communication protocol is an eager protocol.

3. The method for optimizing network performance of claim 1, wherein the repeatedly performing of the test includes increasing the size of the test data to be twice a previous size of the test data when increasing the size of the test data.

4. A computing device in a distributed computing environment constituted of a plurality of computing devices, the computing device comprising:
   a threshold value setting processor configured to set a threshold value having a data size for inter-switching between a first communication protocol and a second communication protocol;
   a controller configured to compare the threshold value set by the threshold value setting processor with a size of data to be transmitted, and determine to transmit data to any one of the first communication protocol and the second communication protocol; and
   a communication device configured to transmit data according to the protocol determined by the controller,
   wherein the threshold value setting processor is configured to:
   initialize a size of test data for network performance measurement,
   perform a test on the network performance by transmitting the test data to each of the first communication protocol and the second communication protocol,
   repeatedly perform the test, when the size of the test data is increased and then the increased size of the test data is a preset size or smaller based on a comparison between the increased size of the test data and the preset size, and
   set a threshold value having a data size being a reference of switching between the first communication protocol and the second communication protocol, based on data collected through the performing of the test, when the increased size of the test data is larger than the preset size, and
   switch from a setting state to a completion state, wherein when a duration in which the completion state exceeds a reference time for periodically re-setting the threshold value, the threshold value setting processor switches the completion state to the setting state of setting the threshold value in order to set the threshold value for protocol inter-switching.

5. The computing device of claim 4, wherein the first communication protocol is an eager protocol and the second communication protocol is a rendezvous protocol, or
the first communication protocol is a rendezvous protocol and the second communication protocol is an eager protocol.

6. The computing device of claim 4, wherein the threshold value setting processor increases the size of the test data to be twice a previous size of the test data when increasing the size of the test data.

* * * * *